(12) United States Patent
Kotra et al.

(10) Patent No.: US 11,290,721 B2
(45) Date of Patent: Mar. 29, 2022

(54) IMAGE PROCESSING DEVICE AND METHOD FOR PERFORMING EFFICIENT DEBLOCKING

(71) Applicant: HUAWEI TECHNOLOGIES CO., LTD., Guangdong (CN)

(72) Inventors: Anand Meher Kotra, Munich (DE); Semih Esenlik, Munich (DE); Zhijie Zhao, Munich (DE); Han Gao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/033,905

(22) Filed: Sep. 27, 2020

(65) Prior Publication Data
US 2021/0014498 A1 Jan. 14, 2021

Related U.S. Application Data

(63) Continuation of application No. PCT/EP2018/057855, filed on Mar. 28, 2018.

(51) Int. Cl.
*H04N 19/117* (2014.01)
*H04N 19/82* (2014.01)
(Continued)

(52) U.S. Cl.
CPC ......... *H04N 19/132* (2014.11); *H04N 19/117* (2014.11); *H04N 19/176* (2014.11); *H04N 19/82* (2014.11)

(58) Field of Classification Search
CPC .. H04N 19/132; H04N 19/117; H04N 19/176; H04N 19/82; H04N 19/42; H04N 19/86
See application file for complete search history.

(56) References Cited

U.S. PATENT DOCUMENTS 9,363,516 B2   6/2016  Van Der Auwera et al.
10,455,253 B1 * 10/2019 Vitvitskyy ............. H04N 19/80
(Continued)

FOREIGN PATENT DOCUMENTS

CN   103220529 A    7/2013
CN   103430537 A   12/2013
(Continued)

OTHER PUBLICATIONS

Andrey Norkin et al., "HEVC Deblocking Filter", IEEE Transactions on Circuits and Systems for Video Technology, vol. 22, No. 12, Dec. 2012, pp. 1746-1754, XP011487156.
(Continued)

*Primary Examiner* — Joseph W Becker

(57) ABSTRACT

A deblocking filter of an image processing device is provided. The deblocking filter is used in an image coding process, for deblocking a block edge between a first coding block and a second coding block of an image. The first block has $S_A$ samples perpendicular to the block edge by N samples parallel to the block edge, and the second block has $S_B$ samples perpendicular to the block edge by N samples parallel to the block edge. No more than $I_A$ samples of the first coding block are used as first filter input values, and no more than $I_B$ samples of the second coding block are used as second filter input values. No more than $M_A$ samples of the first coding block are modified as first filter output values, and no more than $M_B$ samples of the second coding block are modified as second filter output values.

7 Claims, 11 Drawing Sheets

(51) Int. Cl.
*H04N 19/132* (2014.01)
*H04N 19/176* (2014.01)

(56) References Cited

U.S. PATENT DOCUMENTS

| | | | |
|---|---|---|---|
| 2013/0294525 A1* | 11/2013 | Norkin | H04N 19/90 375/240.24 |
| 2013/0329814 A1 | 12/2013 | Norkin et al. | |
| 2015/0189314 A1 | 7/2015 | Alshina et al. | |
| 2015/0249842 A1 | 9/2015 | Norkin | |
| 2015/0365666 A1 | 12/2015 | Dong et al. | |

FOREIGN PATENT DOCUMENTS

| | | |
|---|---|---|
| CN | 103718556 A | 4/2014 |
| CN | 105227958 A | 1/2016 |
| JP | 2013009242 A | 1/2013 |
| RU | 2586003 C2 | 6/2016 |
| WO | 2012035746 A1 | 3/2012 |
| WO | 2012096614 A2 | 7/2012 |
| WO | 2012118421 A1 | 9/2012 |
| WO | 2013104298 A1 | 7/2013 |

OTHER PUBLICATIONS

Andrey Norkin et al. Chapter 7 In-Loop Filters in HEVC, cited in "High Efficiency Video Coding (HEVC): Algorithms and Architectures", 2014. pp. 171-206.

Hyeongmoon Jang et al. Parallel deblocking filter for QTBT, Joint Video Exploration Team (JVET) of ITU-T SG 16 WP 3 and ISO/IEC JTC 1/SC 29/WG 11, JVET-D0044, 4th Meeting: Chengdu, CN, Oct. 15-21, 2016, total 4 pages.

ITU-T H.265(Feb. 2018), Series H: Audiovisual and Multimedia Systems Infrastructure of audiovisual services—Coding of moving video, High efficiency video coding, Feb. 2018. total 692 pages.

ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

Seung-Hwan Kim et al.,"Improvement of chroma deblocking filter",Joint Video Exploration Team (JVET),of ITU-T SG 16 WP 3 and ISO/IEC JTC 1/SC 29/WG 11,4th Meeting: Chengdu, CN, 15 Oct. 21, 2016,Document: JVET-D0108, total:6pages.

\* cited by examiner

Fig. 4

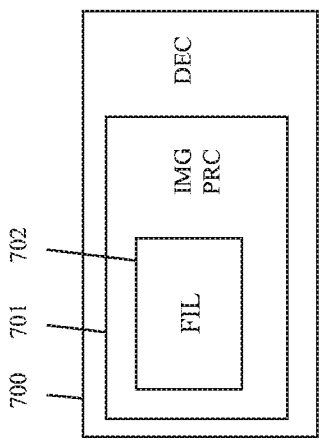
Fig. 5
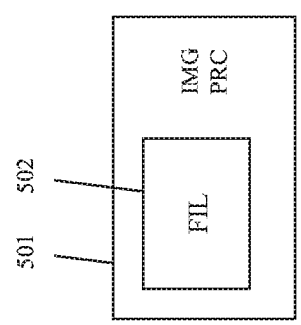
Fig. 7
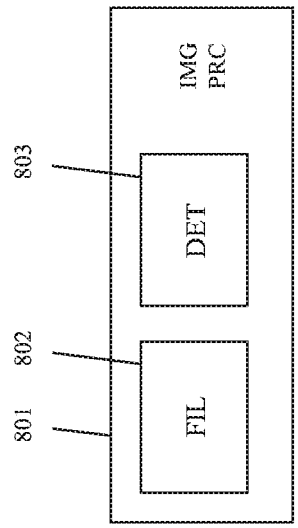
Fig. 6
Fig. 8

Fig. 9

IMAGE PROCESSING DEVICE AND METHOD FOR PERFORMING EFFICIENT DEBLOCKING

CROSS-REFERENCE TO RELATED APPLICATIONS

This application is a continuation of International Application No. PCT/EP2018/057855, filed on Mar. 28, 2018, the disclosure of which is hereby incorporated by reference in its entirety.

TECHNICAL FIELD

Embodiments of the present application relate to the field of picture processing, particularly still picture and video picture coding. Especially, embodiments of the application provide improvements of deblocking filters.

BACKGROUND

Image coding (which includes encoding and decoding) is used in a wide range of digital image applications, for example broadcast digital television (TV), video transmission over internet and mobile networks, real-time conversational applications such as video chat and video conferencing, digital image recording in DVD and Blu-ray discs, video content acquisition and editing systems, and camcorder monitoring in security applications.

Since the development of the block-based hybrid video coding approach in the H.261 standard in 1990, new video coding techniques and tools were developed and formed the basis for new video coding standards. One of the goals of most of the video coding standards was to achieve a bit rate reduction compared to its predecessor without sacrificing picture quality. Further video coding standards include MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), etc. and extensions of these standards, e.g. scalability and/or three-dimensional (3D) extensions.

Block-based image coding schemes have in common that along the block edges, edge artifacts can appear. These artifacts are due to the independent coding of the coding blocks. These edge artifacts are often readily visible to a user. A goal in block-based image coding is to reduce edge artifacts below a visibility threshold. This is done by performing deblocking filtering. Such a deblocking filtering is on the one hand performed on decoding side in order to remove the visible edge artifacts, but also on coding side, in order to prevent the edge artifacts from being encoded into the image at all. Especially for small code block sizes, the deblocking filtering can be challenging.

SUMMARY

In view of the above-mentioned challenges, embodiments of the present application aim to improve the conventional deblocking filtering. Embodiments of the present application have the objective to provide an image processing device that can perform deblocking filtering with reduced processing time. Further, the deblocking should be efficient and accurate.

Embodiments of the application are defined by the features of the independent claims, and further advantageous implementations of the embodiments by the features of the dependent claims.

According to a first aspect of the application, an image processing device is provided. The image processing device is intended for use in an image encoder and/or an image decoder, for deblocking a block edge between a first coding block and a second coding block of an image. The first coding block has a block size $S_A$ perpendicular to the block edge, while the second coding block has a block size $S_B$ perpendicular to the block edge. The image processing device includes a filter for filtering the block edge, and the filter is configured to:
  modify at most a number $M_A$ of sample values of the first coding block, adjacent to the block edge, as first filter output values,
  modify at most a number $M_B$ of sample values of the second coding block, adjacent to the block edge, as second filter output values,
  use at most a number $I_A$ of sample values of the first coding block, adjacent to the block edge, as first filter input values, for calculating the first filter output values and/or the second filter output values,
  use at most a number $I_B$ of sample values of the second coding block, adjacent to the block edge, as second filter input values, for calculating the first filter output values and/or the second filter output values.
  Therein $I_A \neq I_B$ and $M_A \neq M_B$.

This allows for differently handling the two sides of a block edge, and therefore ensures that the deblocking can be performed in parallel, independent of coding block size. Thus, the processing time for the deblocking filtering is significantly reduced.

It should be noted that the image processing device may include a processor configured to carry out the filtering and modifying.

Advantageously, $S_A \neq S_B$. This ensures that especially edges between blocks of different coding block sizes can be deblocked in parallel.

Preferably, the image processing device includes a determiner, configured to determine if the block edge is to be filtered and/or if a strong filtering or a weak filtering is to be performed, based upon
  at most a number $D_A$ of sample values of the first coding block, adjacent to the block edge, as first filter decision values, and
  at most a number $D_B$ of sample values of the second coding block, adjacent to the block edge, as second filter decision values.

This allows for an accurate and parallel determination of which edges are actually deblocked, and which edges are not deblocked.

Advantageously, the first filter input values are identical to the first filter decision values. The second filter input values are identical to the second filter decision values. This further increases the efficiency of the deblocking.

Preferably, if $S_A = 4$, the filter is configured to set $I_A$ to 3, and $M_A$ to 1. An efficient deblocking is thereby assured.

Advantageously, if $S_B = 8$, the filter is configured to set $I_B$ to 4, and $M_B$ to 3 or 4. This ensures an especially accurate and parallel deblocking.

Preferably, if $S_B = 16$, the filter is configured to set $I_B$ to 8, and $M_B$ to 7 or 8. A further increase in deblocking accuracy is thereby achieved.

Advantageously, if $S_B > 4$, the filter is configured to set $I_B$ to $S_B/2$, and $M_B$ to $S_B/2$ or $S_B/2 - 1$. An especially efficient deblocking is thereby possible.

Preferably, if $S_A = 8$, the filter is configured to set $I_A$ to $S_A/2$, and $M_A$ to $S_A/2$ or $S_A/2 - 1$. A further increase in blocking efficiency and accuracy is thereby achieved.

Preferably, if $S_B>8$, the filter is configured to set $I_B$ to $S_B/2$, and $M_B$ to $S_B/2$ or $S_B/2-1$. This further increases efficiency and accuracy of the deblocking.

Advantageously, if the block edge is a horizontal block edge, and if the block edge overlaps with a coding tree unit (CTU) block edge of the image, and if the second coding block is a current block and the first coding block is a neighboring block of said current block, the filter is configured to set $I_A$ to 4, and $M_A$ to 3 or 4. This significantly reduces the line memory required for storing the pixel values of the previous coding units necessary for performing the deblocking at the horizontal coding unit edge.

According to a second aspect of the application, an encoder for encoding an image, comprising a previously described image processing device is provided. This allows for an efficient and accurate encoding of the image.

According to a third aspect of the application, a decoder, for decoding an image, comprising a previously shown image processing device is provided. This allows for an especially accurate and efficient decoding of the image.

According to a fourth aspect of the application, a deblocking method, for deblocking a block edge between a first coding block and a second coding block of an image, in an image encoding and/or an image decoding, is provided. The first coding block has a block size $S_A$ perpendicular to the block edge. The second coding block has a block size $S_B$ perpendicular to the block edge. The decoding includes a filtering process, comprising:

modifying at most a number $M_A$ of sample values of the first coding block, adjacent to the block edge, as first filter output values, modifying at most a number $M_B$ of sample values of the second coding block, adjacent to the block edge, as second filter output values, using at most a number $I_A$ of sample values of the first coding block, adjacent to the block edge, as first filter input values, for calculating the first filter output values and/or the second filter output values, using at most a number $I_B$ of sample values of the second coding block, adjacent to the block edge, as second filter input values, for calculating the first filter output values and/or the second filter output values.

Therein $I_A \neq I_B$ and $M_A \neq M_B$. This allows for an especially accurate and efficient deblocking.

Advantageously, $S_A \neq S_B$. This ensures that especially edges between blocks of different coding block sizes can be deblocked in parallel.

Preferably, the method comprises determining if the block edge is to be filtered and/or if a strong filtering or a weak filtering is to be performed, based upon at most a number $D_A$ of sample values of the first coding block, adjacent to the block edge, as first filter decision values, and at most a number $D_B$ of sample values of the second coding block, adjacent to the block edge, as second filter decision values.

This allows for an accurate and parallel determination of which edges are actually deblocked, and which edges are not deblocked.

Advantageously, the first filter input values are identical to the first filter decision values. The second filter input values are identical to the second filter decision values. This further increases the efficiency of the deblocking.

Preferably, if $S_A=4$, the filtering uses $I_A=3$, and $M_A=1$. An efficient deblocking is thereby assured.

Advantageously, if $S_B=8$, the filtering uses $I_B=4$, and $M_B=3$ or 4. This ensures an especially accurate and parallel deblocking.

Preferably, if $S_B=16$, the filtering uses $I_B=8$, and $M_B=7$ or 8. A further increase in deblocking accuracy is thereby achieved.

Advantageously, if $S_B>4$, the filtering uses $I_B=S_B/2$, and $M_B=S_B/2$ or $S_B/2-1$. An especially efficient deblocking is thereby possible.

Preferably, if $S_A=8$, the filtering uses $I_A=S_A/2$, and $M_A=S_A/2$ or $S_A/2-1$. A further increase in blocking efficiency and accuracy is thereby achieved.

Preferably, if $S_B>8$, the filtering uses $I_B=S_B/2$, and $M_B=S_B/2$ or $S_B/2-1$. This further increases efficiency and accuracy of the deblocking.

Advantageously, if the block edge is a horizontal block edge, and if the block edge overlaps with a coding tree unit (CTU) block edge of the image, and if the second coding block is a current block and the first coding block is a neighboring block of said current block, the filtering uses $I_A=4$, and $M_A=3$ or 4. This significantly reduces the line memory required for storing the pixel values of the previous coding units necessary for performing the deblocking at the horizontal coding unit edge.

According to a fifth aspect of the application, an encoding method for encoding an image, comprising a previously shown deblocking method is provided. This allows for an efficient and accurate encoding of the image.

According to a sixth aspect of the application, a decoding method for encoding an image, comprising a previously shown deblocking method is provided. This allows for an efficient and accurate decoding of the image.

According to a seventh aspect of the application, a computer program product with a program code for performing the previously shown method when the computer program runs on a computer, is provided.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the application are described in more detail with reference to the accompanying figures and drawings, in which:

FIG. 4 shows three exemplary coding blocks;

FIG. 5 shows a first embodiment of the image processing device according to the first aspect of the application;

FIG. 6 shows a first embodiment of the encoder according to the second aspect of the application;

FIG. 7 shows a first embodiment of the decoder according to the third aspect of the application;

FIG. 8 shows a second embodiment of the image processing device according to the first aspect of the application;

FIG. 9 shows three exemplary coding blocks including different sample values used for deblocking filtering and modified for deblocking filtering, as employed by a third embodiment of the image processing device of the first aspect of the application;

In the following, identical reference signs refer to identical or at least functionally equivalent features. In part, different reference signs referring to the same entities have been used in different figures.

DETAILED DESCRIPTION OF THE EMBODIMENTS

Figure 1:
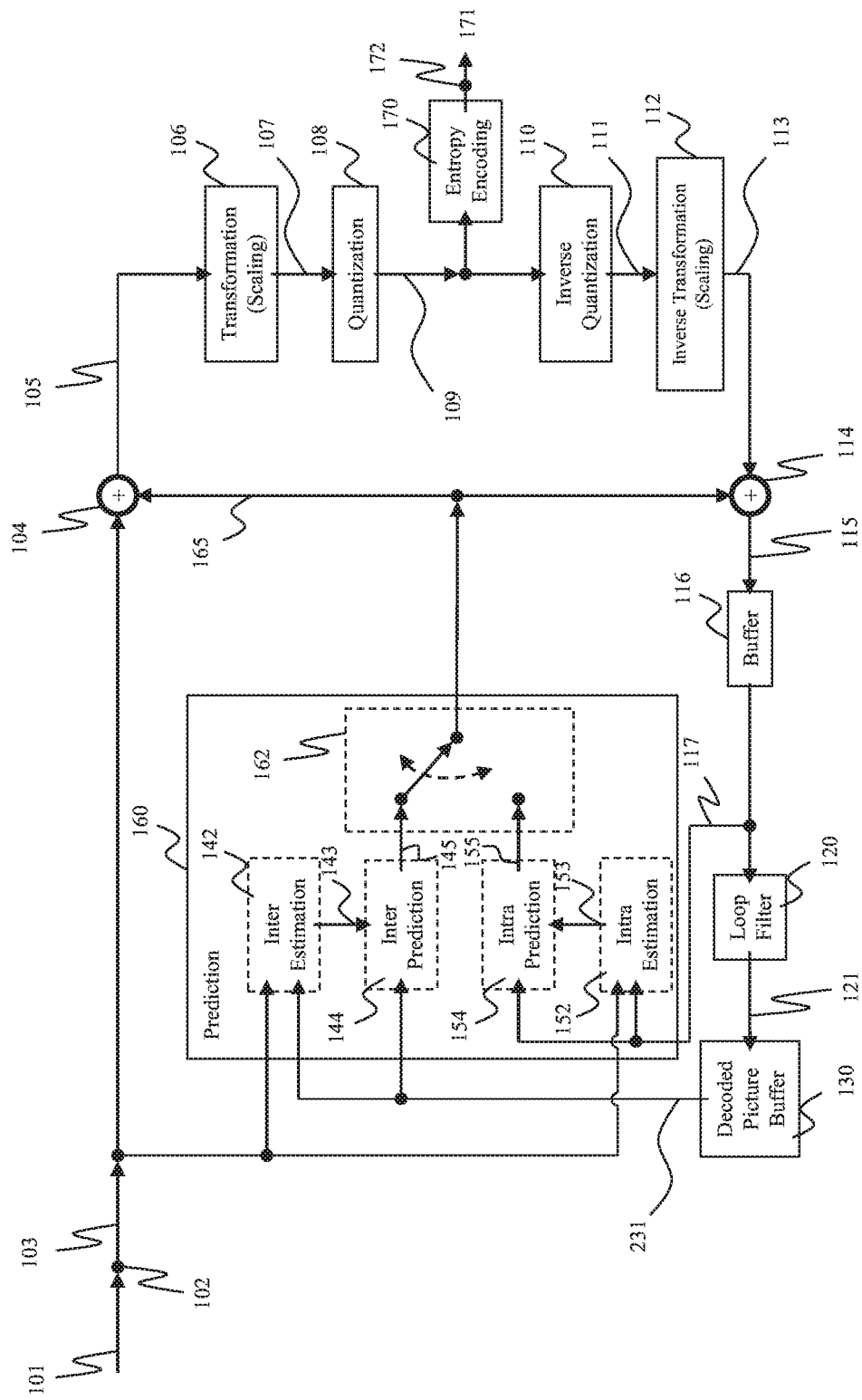
FIG. 1 is a block diagram showing an example of a video encoder configured to implement embodiments of the application.
Figure 2:
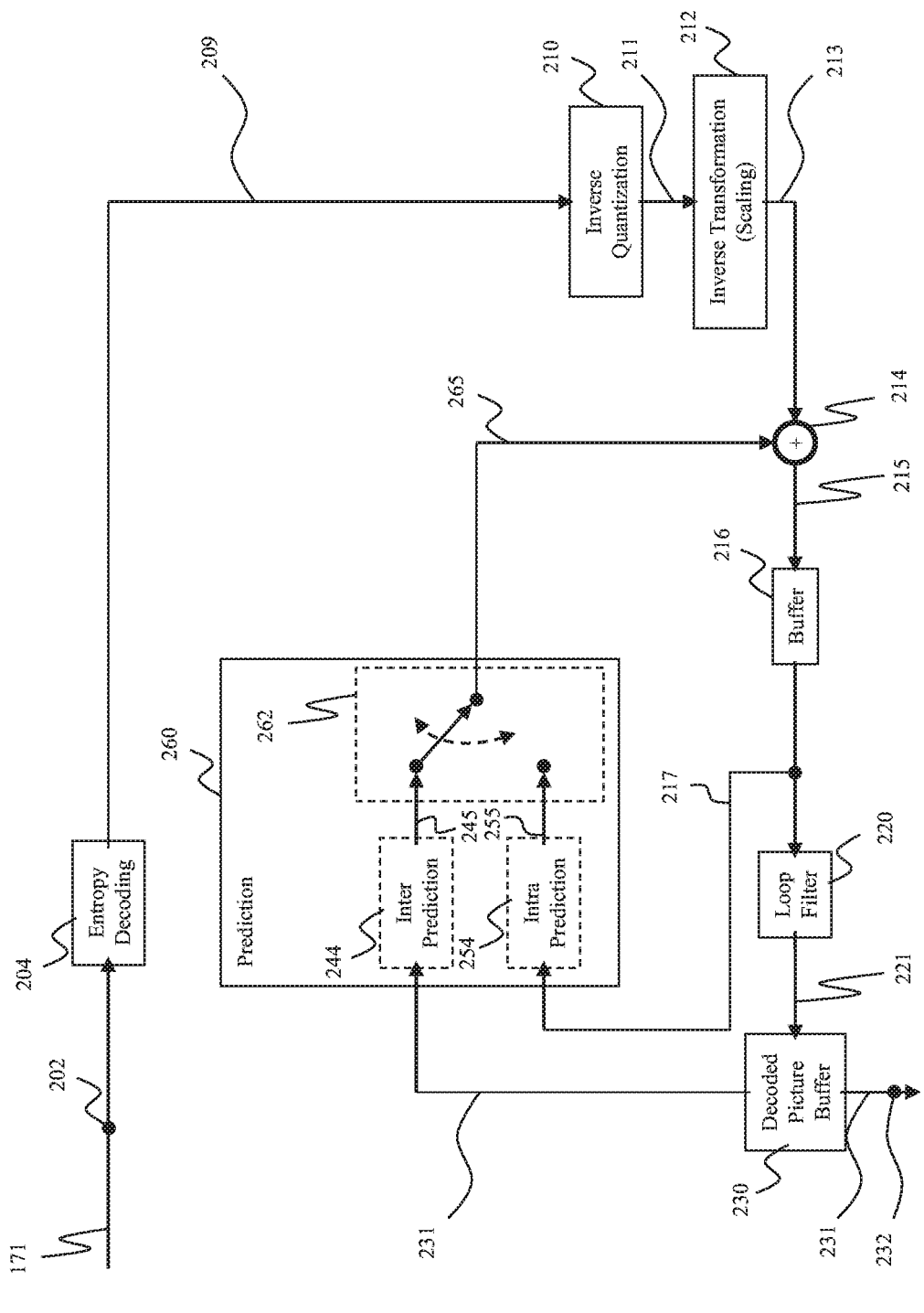
FIG. 2 is a block diagram showing an example structure of a video decoder configured to implement embodiments of the application.
Figure 3:
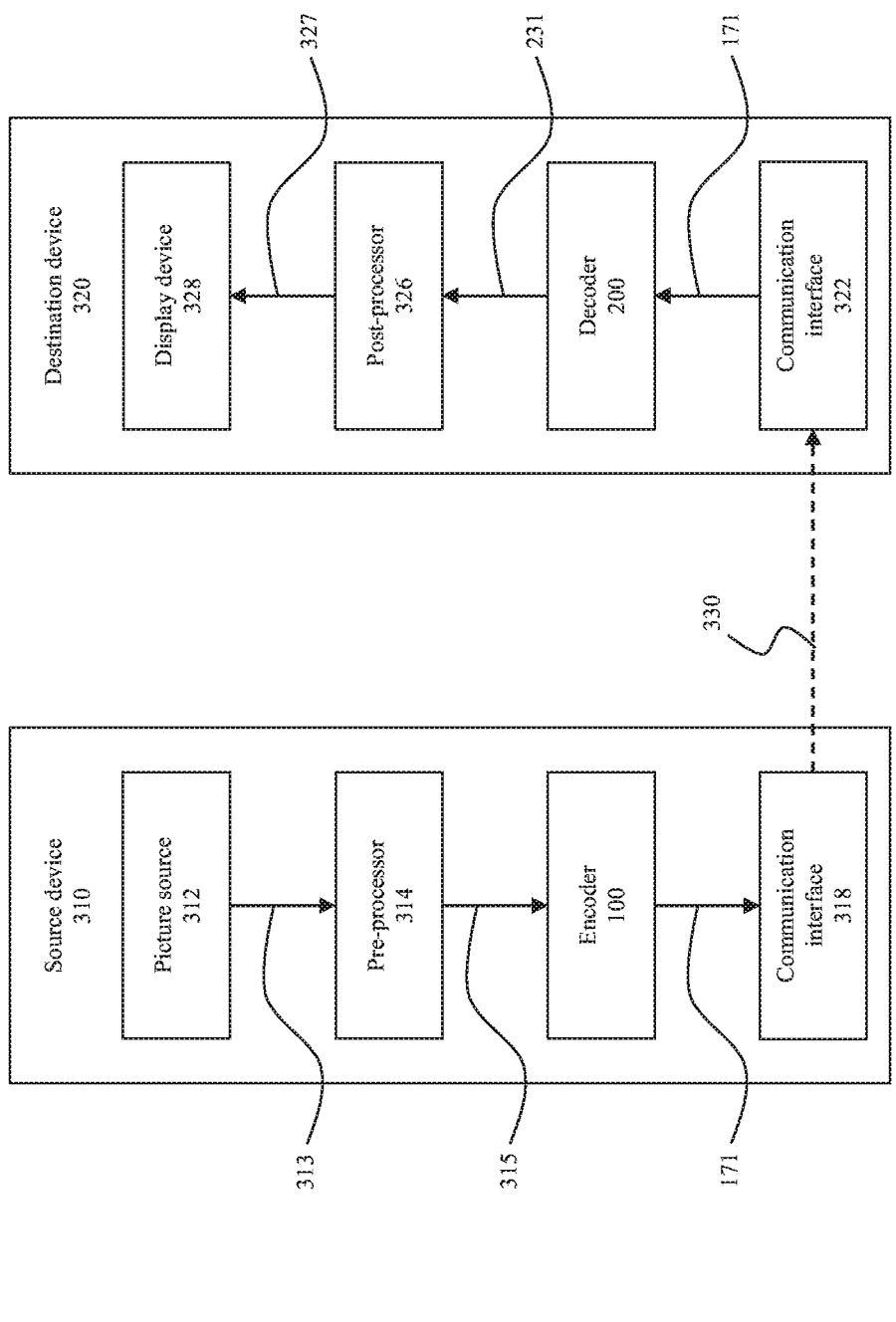
FIG. 3 is a block diagram showing an example of a video coding system configured to implement embodiments of the application.

The general concept of image coding is illustrated in FIGS. 1 to 3. Along in FIG. 4, a disadvantage of a conventional deblocking filter is shown. With regard to FIGS. 5 to 13, the construction and function of different embodiments of the apparatus provided by this application are shown and described. Finally, with regard to FIG. 14, an embodiment of the method provided by this application is shown and described.

In the following description, reference is made to the accompanying figures, which form part of the disclosure, and which show, by way of illustration, specific aspects of embodiments of the application or specific aspects in which embodiments of the present application may be used. It is understood that embodiments of the application may be used in other aspects and include structural or logical changes not depicted in the figures. The following detailed description, therefore, is not to be taken in a limiting sense, and the scope of the present application is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture, the terms frame or image may be used as synonyms in the field of video coding. Video coding includes two parts, video encoding and video decoding. Video encoding is performed at the source side, and typically includes processing (e.g. by compression) the original video pictures to reduce the amount of data required for representing the video pictures (for more efficient storage and/or transmission). Video decoding is performed at the destination side, and typically includes the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level. For example, spatial (intra picture) prediction and temporal (inter picture) prediction are used to generate a prediction block. The prediction block is subtracted from the current block (block currently processed/to be processed) to obtain a residual block. The residual block is transformed and the transformed residual block is quantized in the transform domain to reduce the amount of data to be transmitted (compression). At the decoder, the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

Video picture processing (also referred to as moving picture processing) and still picture processing (the term processing includes coding) share many concepts and technologies or tools. In the following, the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following, embodiments of an encoder 100, a decoder 200 and a coding system 300 are described based on FIGS. 1 to 3 before describing embodiments of the application in more detail based on FIGS. 4 to 14.

FIG. 3 is a conceptual or schematic block diagram illustrating an embodiment of a coding system 300. The coding system 300 includes a source device 310 configured to provide encoded data (e.g. an encoded picture) 330 to a destination device 320 for decoding the encoded data 330.

The source device 310 includes an encoder or encoding unit 100, and may additionally include a picture source 312, a pre-processor or pre-processing unit 314, and a communication interface or communication unit 318.

The picture source 312 may include or may be any kind of picture capturing device for capturing a real-world picture, or any kind of picture generating device for generating a computer animated picture. Further, the picture source 312 may be any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture" or "image", unless specifically described otherwise, while the previous explanations with regard to the term "picture" covering "video pictures" and "still pictures" still hold true, unless explicitly specified differently.

A digital picture is or can be regarded as a two-dimensional array or matrix of samples with intensity values. A sample in the array may also be referred to as a pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB (red, green, blue) format or color space, a picture includes a corresponding red, green and blue sample array. However, in video coding each pixel is typically represented in a luminance/chrominance format or color space, e.g. YCbCr, which include a luminance component indicated by Y (sometimes L is used instead) and two chrominance components indicated by Cb (blue-difference) and Cr (red-difference). The luminance (or luma in short) component Y represents the brightness or grey level intensity (e.g. like in a grey-scale picture), while the two chrominance (or chroma in short) components Cb and Cr represent the chromaticity or color information components. Accordingly, a picture in YCbCr format includes a luminance sample array of luminance sample values (Y), and two chrominance sample arrays of chrominance values (Cb and Cr). Pictures in RGB format may be converted or transformed into YCbCr format and vice versa, and the process is also known as color transformation or conversion. If a picture is monochrome, the picture may include only a luminance sample array.

The picture source 312 may be, for example a camera for capturing a picture, a memory including or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 313 may be the same interface as or a part of the communication interface 318.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may include, e.g., trimming, color format conversion (e.g. from RGB to YCbCr), color correction, and/or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device (e.g. the destination device 320 or any other device) for storage or direct reconstruction, or to process the encoded picture data 171 for respectively before storing the encoded data 330 and/or transmitting the encoded data 330 to another device for decoding or storing.

The destination device 320 includes a decoder or decoding unit 200, and may additionally include a communication interface or communication unit 322, a post-processor or post-processing unit 326 and a display device 328.

The communication interface 322 of the destination device 320 is configured receive the encoded picture data 171 or the encoded data 330, e.g. directly from the source device 310 or from any other source, such as a memory.

The communication interface 318 and the communication interface 322 may be configured to transmit respectively receive the encoded picture data 171 or encoded data 330 via a direct communication link between the source device 310 and the destination device 320, e.g. a direct wired or wireless connection, or via any kind of network, e.g. a wired or wireless network or any combination thereof, or any kind of private and public network, or any kind of combination thereof.

The communication interface 318 may be configured to package the encoded picture data 171 into an appropriate format, e.g. packets, for transmission over a communication link or communication network, and may further include data loss protection and data loss recovery.

The communication interface 322, forming the counterpart of the communication interface 318, may be, configured to de-package the encoded data 330 to obtain the encoded picture data 171 and may further be configured to perform data loss protection and data loss recovery, such as error concealment.

Both communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data or a decoded picture 231 (further details will be described, e.g., based on FIG. 2).

The post-processor or post-processing unit 326 of the destination device 320 is configured to post-process the decoded picture data 231, e.g. the decoded picture 231, to obtain post-processed picture data 327, e.g. a post-processed picture 327. The post-processing performed by the post-processing unit 326 may include, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be any kind of display for representing the reconstructed picture, e.g. an integrated or external display or monitor. The displays may be cathode ray tubes (CRT), liquid crystal displays (LCD), plasma displays, organic light emitting diodes (OLED) displays, or any other kind of displays.

Although FIG. 3 depicts the source device 310 and the destination device 320 as separate devices, embodiments of devices may also include both or include both functionalities, the source device 310 or corresponding functionality and the destination device 320 or corresponding functionality. In such embodiments the source device 310 or the corresponding functionality and the destination device 320 or the corresponding functionality may be implemented using the same hardware and/or software or by separate hardware and/or software or any combination thereof.

It is apparent that, based on the description, the existence and (exact) split of functionalities of the different units or functionalities within the source device 310 and/or destination device 320 as shown in FIG. 3 may vary depending on the actual device and application.

The source device 310 and the destination device 320 as shown in FIG. 3 are just an example and embodiments of the application are not limited to those shown in FIG. 3.

Source device 310 and destination device 320 may include any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like. (also servers and work-stations for large scale professional encoding/decoding, e.g. network entities) and may use no or any kind of operating system.

FIG. 1 shows a schematic/conceptual block diagram of an embodiment of an encoder 100. The encoder 110 includes an input 102, a residual calculation unit 104, a transformation unit 106, a quantization unit 108, an inverse quantization unit 110, and inverse transformation unit 112, a reconstruction unit 114, a buffer 118, a loop filter 120, a decoded picture buffer (DPB) 130, a prediction unit 160, an inter estimation unit 142, an inter prediction unit 144, an intra-estimation unit 152, an intra-prediction unit 154, a mode selection unit 162, an entropy encoding unit 170, and an output 172. The encoder 100 as shown in FIG. 1 may also be referred to as hybrid video encoder or a video encoder according to a hybrid video codec.

For example, the residual calculation unit 104, the transformation unit 106, the quantization unit 108, and the entropy encoding unit 170 form a forward signal path of the encoder 100. The inverse quantization unit 110, the inverse transformation unit 112, the reconstruction unit 114, the buffer 118, the loop filter 120, the decoded picture buffer (DPB) 130, the inter prediction unit 144, and the intra-prediction unit 154 form a backward signal path of the encoder 100. The backward signal path of the encoder 100 corresponds to the signal path of the decoder (see decoder 200 in FIG. 2).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded. The picture 101 may also be referred to as current picture or picture to be coded (in particular in video coding to distinguish the current picture from other pictures, e.g. previously encoded and/or decoded pictures of the same video sequence, i.e. the video sequence which also includes the current picture).

Embodiments of the encoder 100 may include a partitioning unit (not depicted in FIG. 1), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

Like the picture 101, the block 103 again is or can be regarded as a two-dimensional array or matrix of samples with intensity values (sample values), although of smaller dimensions than the picture 101. In other words, the block 103 may include, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured encode the picture 101 block by block, e.g. the encoding and prediction is performed per block 103.

The residual calculation unit 104 is configured to calculate a residual block 105 based on the picture block 103 and a prediction block 165, e.g. by subtracting sample values of the prediction block 165 from sample values of the picture block 103, sample by sample (pixel by pixel) to obtain the residual block 105 in the sample domain. Further details about the prediction block 165 are provided later.

The transformation unit 106 is configured to apply a transformation, e.g. a spatial frequency transform or a linear spatial transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse de-quantization, e.g. by inverse quantization 110, may include multiplication by the quantization step size.

Embodiments according to HEVC may be configured to use a quantization parameter to determine the quantization step size. Generally, the quantization step size may be calculated based on a quantization parameter using a fixed point approximation of an equation including division. Additional scaling factors may be introduced for quantization and de-quantization to restore the norm of the residual block, which might be modified because of the scaling used in the fixed point approximation of the equation for quantization step size and quantization parameter. In one example implementation, the scaling of the inverse transform and de-quantization might be combined. Alternatively, customized quantization tables may be used and signaled from an encoder to a decoder, e.g. in a bit-stream. The quantization is a lossy operation, wherein the loss increases with increasing quantization step sizes.

Embodiments of the encoder 100 (or respectively of the quantization unit 108) may be configured to output the quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain de-quantized coefficients 111, e.g. by applying the inverse of the quantization scheme applied by the quantization unit 108 based on or using the same quantization step size as the quantization unit 108. The de-quantized coefficients 111 may also be referred to as de-quantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed de-quantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, the buffer unit 116 is not only used for storing the reconstructed blocks 115 for intra estimation 152 and/or intra prediction 154 but also for the loop filter unit 120 (not shown in FIG. 1). The embodiments of the encoder 100 may also be configured such that the buffer unit 116 and the decoded picture buffer unit 130 form one buffer. Further embodiments may be configured to use filtered blocks 121 and/or blocks or samples from the decoded picture buffer 130 (both not shown in FIG. 1) as input or basis for intra estimation 152 and/or intra prediction 154.

The loop filter unit 120 (or short "loop filter" 120), is configured to filter the reconstructed block 115 to obtain a filtered block 121, e.g. by applying a de-blocking sample-adaptive offset (SAO) filter or other filters, e.g. sharpening or smoothing filters or collaborative filters. The filtered block 121 may also be referred to as filtered reconstructed block 121. In the following, the loop filter 120 is also referred to as deblocking filter.

Embodiments of the loop filter unit 120 may include (not shown in FIG. 1) a filter analysis unit and the actual filter unit, wherein the filter analysis unit is configured to determine loop filter parameters for the actual filter. The filter analysis unit may be configured to apply fixed pre-determined filter parameters to the actual loop filter, adaptively select filter parameters from a set of predetermined filter parameters or adaptively calculate filter parameters for the actual loop filter.

Embodiments of the loop filter unit 120 may include (not shown in FIG. 1) one or a plurality of filters (loop filter components/subfilters), e.g. one or more of different kinds or types of filters, e.g. connected in series or in parallel or in any combination thereof. Each of the filters may include individually or jointly with other filters of the plurality of filters a filter analysis unit to determine the respective loop filter parameters, e.g. as described in the previous paragraph.

Embodiments of the encoder 100 (respectively loop filter unit 120) may be configured to output the loop filter parameters, e.g. directly or entropy encoded via the entropy encoding unit 170 or any other entropy coding unit, so that, a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the application may also be configured to use the previously filtered blocks and corresponding filtered sample values of the decoded picture buffer 130 for any kind of estimation or prediction, e.g. intra and inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

The mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction unit 160 and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may include intra-prediction modes and/or inter-prediction modes.

The set of intra-prediction modes may include 32 different intra-prediction modes, e.g. non-directional modes like DC (or mean) mode and planar mode, or directional modes, e.g. as defined in H.264, or may include 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additionally to the above prediction modes, skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection includes the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g. reconstructed blocks of one or a plurality of other/different previously decoded pictures 231, for inter estimation (or "inter picture estimation"). A video sequence may include the current picture and the previously decoded pictures 231, or in other words, the current picture and the previously decoded pictures 231 may be part of or form a sequence of pictures forming a video sequence.

The encoder 100 may be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 152, both functionalities may be performed as one (inter estimation) requires/includes calculating an/the inter prediction block, i.e. the or a "kind of" inter prediction 154), e.g. by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, be configured to select an intra prediction mode from a plurality of (predetermined) intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion.

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation) requires/includes calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bit-stream 171.

FIG. 2 shows an exemplary video decoder 200 configured to receive encoded picture data (e.g. an encoded bit-stream) 171, which may be encoded by the encoder 100, to obtain a decoded picture 231.

The decoder 200 includes an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 260, and an output 232.

The entropy decoding unit 204 is configured to perform entropy decoding to the encoded picture data 171 to obtain quantized coefficients 209 and/or decoded coding parameters (not shown in FIG. 2). The decoded parameters include any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 220 (with regard to the actual loop filter as the loop filter 220 typically does not include a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may include an inter prediction unit 244 and an inter prediction unit 254, wherein the inter prediction unit 144 may be identical in function to the inter prediction unit 144, and the inter prediction unit 154 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 230, e.g. via output 232, for presentation or viewing to a user.

Although embodiments of the application have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general, only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g. partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

The present application deals with the functionality of the deblocking filter, also referred to as loop filter in FIG. 1 and FIG. 2.

Video coding schemes such as H.264/AVC and HEVC are designed along the principle of block-based hybrid video coding. Using this principle a picture is first partitioned into blocks and then each block is predicted by using intra-picture or inter-picture prediction. These blocks are coded relatively from the neighboring blocks and approximate the original signal with some degree of similarity. Since coded blocks only approximate the original signal, the difference between the approximations may cause discontinuities at the prediction and transform block boundaries. These discontinuities are attenuated by the deblocking filter. HEVC replaces the macroblock structure of H.264/AVC with the concept of coding tree unit (CTU) of maximum size 64×64 pixels. The CTU can further be partitioned into a quadtree-decomposition scheme into smaller coding units (CU), which can be subdivided down to a minimum size of 8×8 pixels. HEVC also introduces the concepts of prediction blocks (PB) and Transform blocks (TB).

Deblocking in HEVC is performed for all the edges belonging to a coding unit (CU), prediction units (PU) and transform units (TU) which overlap with an 8×8 grid. Moreover, the deblocking filter in HEVC is much more parallel processing friendly when compared to H.264/AVC where the filter operations are performed over a 4×4 grid. The vertical and horizontal block boundaries in HEVC are processed in a different order than in H.264/AVC. In HEVC, all the vertical block boundaries in the picture are filtered first, and then all the horizontal block boundaries are filtered. Since the minimum distance between two parallel block boundaries in HEVC is eight samples, and HEVC deblocking modifies at most three samples from the block boundary and uses four samples from the block boundary for deblocking decisions, filtering of one vertical boundary does not affect filtering of any other vertical boundary. This means there are no deblocking dependencies across the block boundaries. In principle, any vertical block boundary can be processed in parallel to any other vertical boundary. The same holds for the horizontal boundaries, although the modified samples from filtering the vertical boundaries are used as the input to filtering the horizontal boundaries.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The Joint Exploration Model (JEM) describes the features that are under coordinated test model study by the Joint Video Exploration Team (JVET) of ITU-T VCEG and ISO/IEC MPEG as potential enhanced video coding technology beyond the capabilities of HEVC.

The JEM software uses a new partitioning block structure scheme called Quadtree plus binary tree (QTBT).

The QTBT structure removes the concepts of multiple partition types i.e. removes the separation of coding units (CU), prediction units (PU) and transform units (TU). Therefore, CU, PU and TU are equivalent. QTBT supports more flexible CU partition shapes wherein a CU can have either a square or a rectangular shape. The minimum width and height of a CU can be 4 samples and the sizes of the CU can also be 4×N or N×4 where N can take values of 4, 8, 16, and 32.

The current LUMA deblocking filter in JEM filters all the CU block edges including the edges belong to CU's whose size is 4×N and N×4, resulting in the following disadvantages:

Already filtered samples can affect filtering decision of consecutive block boundary. Adjacent block boundaries cannot be processed in parallel.

Figure 4:
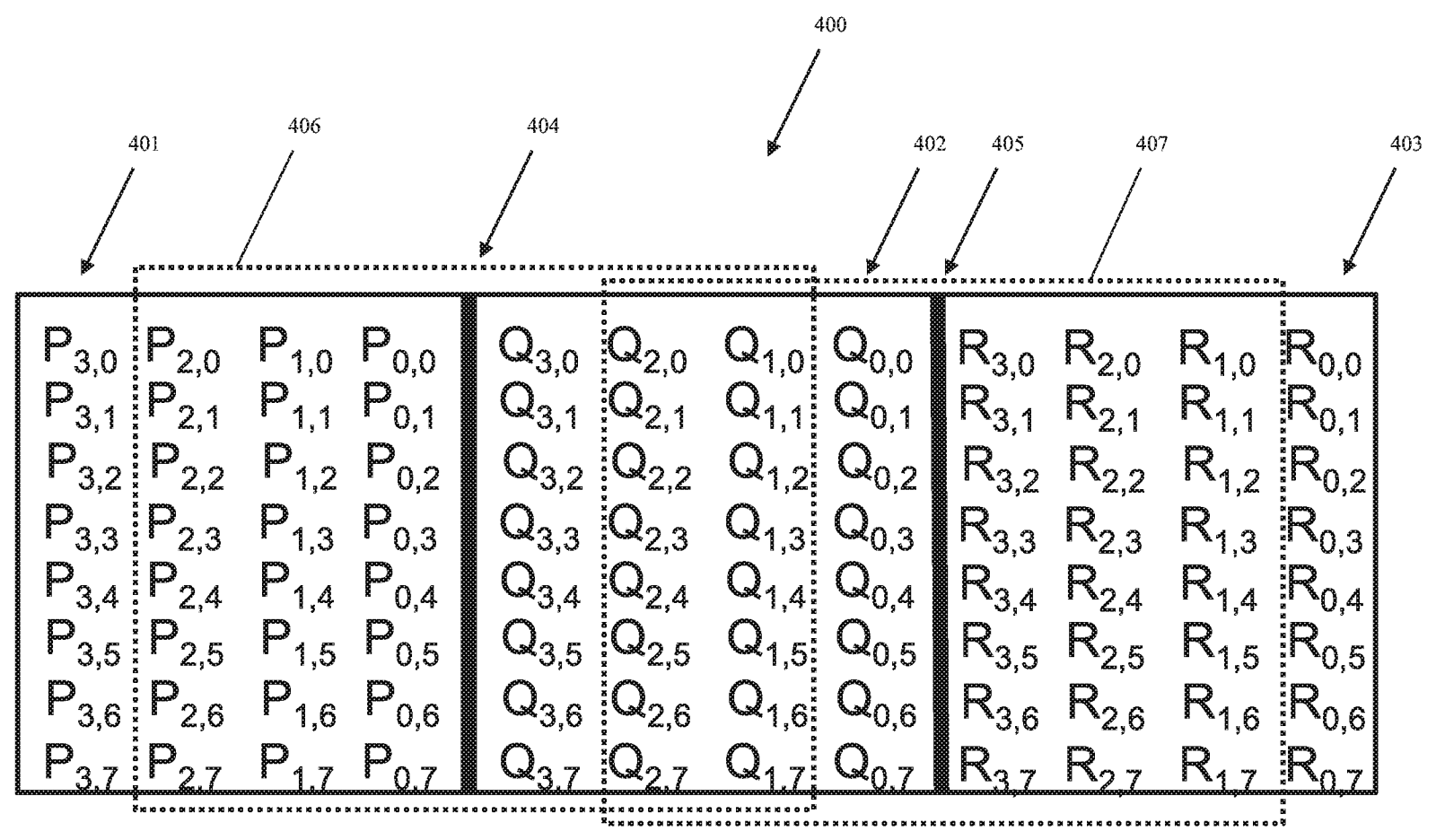

A current deblocking filter operation used for JEM (with QTBT portioning) is depicted in FIG. 4.

Coding blocks 401, 402, 403, also referred to as P, Q and R respectively, are three CU's. The size of the CU's are 8×8, 4×8 and 4×8 respectively, (N=8) samples. Strong filtering of edge 404, also referred to as E1, modifies samples marked in the dashed box 406. Strong filtering of edge 405, also referred to as E2, modifies samples marked in the dashed box 407. As we can see there is an overlap of the box 406 and the box 407 and therefore already filtered samples in block Q during edge E1 filtering affect filtering decision of consecutive block boundary (edge E2). Adjacent block boundaries (E1 and E2) cannot be processed in parallel.

It is therefore necessary to perform the deblocking filtering in a serial manner. This leads to a very long processing time. Especially with upcoming processor technologies, employing more and more parallel processing structures, this leads to an unnecessarily long processing time. By adapting the deblocking filtering to work in parallel, significant processing time can be saved.

Now along FIG. 5 to FIG. 8, different embodiments of the first aspect, second aspect and third aspect of the application are briefly described. The detailed function of the embodiments depicted in FIG. 5 to FIG. 8 are described later on with regard to FIG. 9 to FIG. 13.

In FIG. 5, a first embodiment of the image processing device of the first aspect of the application is shown. An image processing device 501 includes a filter for filtering a block edge between a first coding block and a second coding block of an image.

Especially, the image processing device 501 is intended for deblocking a block edge between a first coding block and a second coding block of an image encoded with a block code. The first coding block has a block size $S_A$ perpendicular to the block edge, while the second coding block has a block size $S_B$ perpendicular to the block edge. The image processing device 501 includes a filter 502 for filtering the block edge. The filter is configured to:

modify at most a number $M_A$ of sample values of the first coding block, adjacent to the block edge, as first filter output values, modify at most a number $M_B$ of sample values of the second coding block, adjacent to the block edge, as second filter output values, use at most a number $I_A$ of sample values of the first coding block, adjacent to the block edge, as first filter input values, for calculating the first filter output values and/or the second filter output values, use at most a number $I_B$ of sample values of the second coding block, adjacent to the block edge, as second filter input values, for calculating the first filter output values and/or the second filter output values, as described above.

Therein $I_A$ is different from $I_B$, and $M_A$ is different from $M_B$.

In FIG. 6, an embodiment of an encoder according to the second aspect of the application is shown. An encoder 600 includes an image processing device 601, which in turn includes a filter 602. The image processing device 601 corresponds to the image processing device 501 of FIG. 5. The encoder works according to the principle encoder shown in FIG. 1. The loop filter, also referred to as deblocking filter of FIG. 1 is replaced by the image processing device 601, shown here.

In FIG. 7, an embodiment of the third aspect of the application is shown. A decoder 700 includes an image processing device 701, which in turn includes a filter 702. The image processing device 701 corresponds to the image processing device 501 of FIG. 5. The decoder 700 works according to the principle decoder shown in FIG. 2. The loop filter, also referred to as deblocking filter of FIG. 2 is replaced by the image processing device 701, depicted here.

Finally, in FIG. 8, a further embodiment of the image processing device according to the first aspect of the application is shown. The image processing device 801 includes a filter 802 and a determiner 803. The determiner 803 determines, if the block edge is to be filtered, and/or if a strong filtering or a weak filtering is to be performed. This decision is based upon at most a number $D_A$ of sample values of the first coding block, adjacent to the block edge, as first filter decision values and at most a number of $D_B$ of sample values of the second coding block adjacent to the block edge, as second filter decision values.

The filter decision values do not necessarily have to be identical to the filter input values described along FIG. 5. In practice, they can be identical, though.

The image processing device according to FIG. 8 moreover includes a filter 802, which operates comparable to the filter 502 of FIG. 5.

Figure 9:
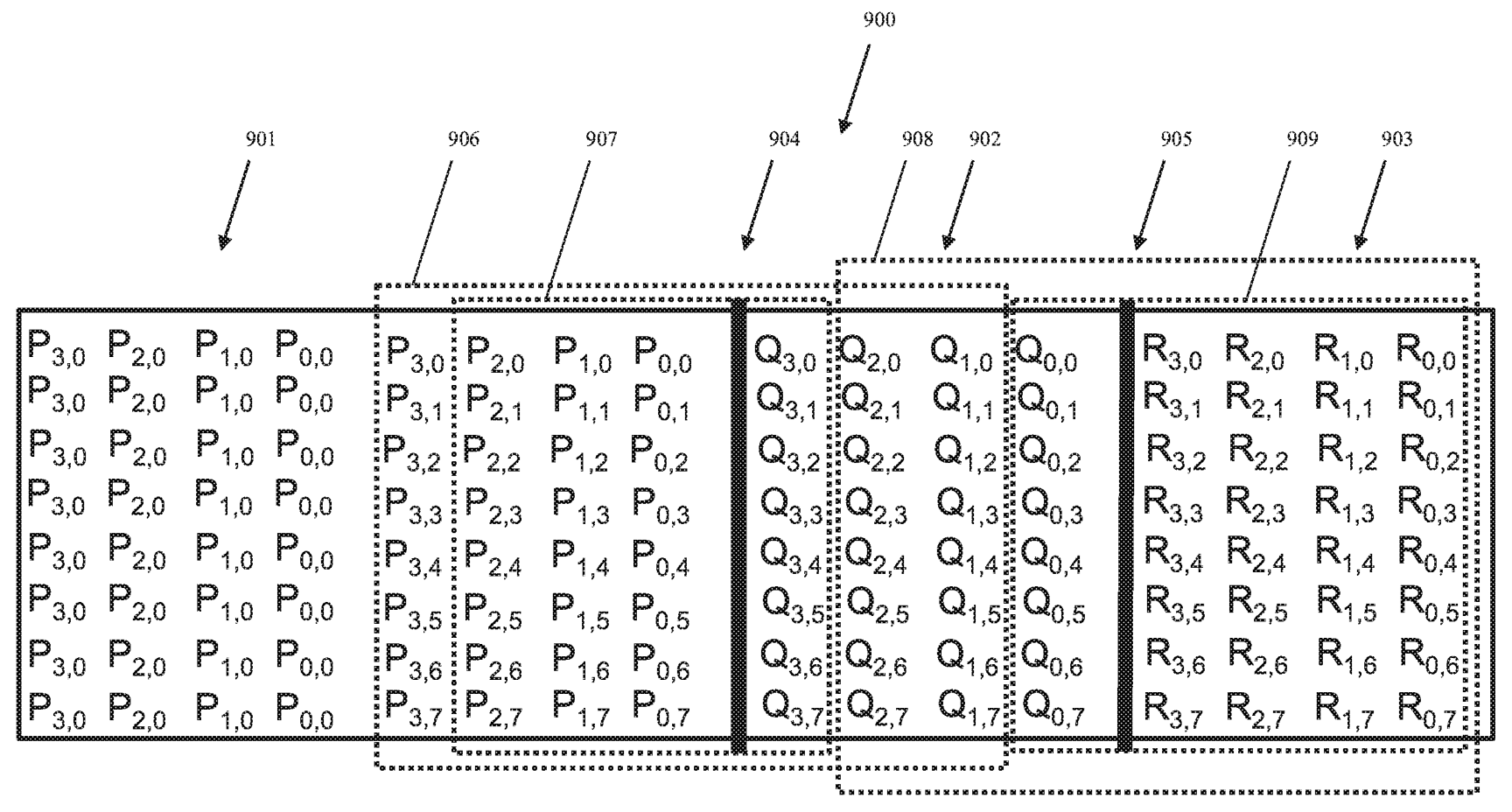

In detail, the problem of parallelizing the deblocking filtering may be solved by an approach as shown in FIG. 9. There, an image 900 includes three coding blocks 901, 902 and 903. Between the coding blocks 901 and 902, a block edge 904 exists. Between coding blocks 902 and 903, a block edge 905 exists. When performing the filtering of the edge 904, the sample values shown in the dashed line 906 are taken into account. These are the filter input values, as described earlier. At the same time, only the sample values depicted within the dashed line 907 are modified by the filtering. These sample values are the filter output values, as described earlier.

When filtering the block edge 905, the sample values within the dashed line 908 are used as filter input values, while only the sample values within the dashed line 909 are modified and constitute the filter output values.

It can clearly be seen that the filter output values of the filtering of the edge 904, shown in the dashed line 907 do not overlap with the filter input values of filtering the edge 905, shown within the dashed line 908. Vice versa, also the filter output values of filtering the block edge 905, depicted within the dashed line 909 do not overlap with the filter input values of filtering the block edge 904 depicted within the dashed line 906. A parallel processing of the filtering of both block edges is possible, since there are no inter-dependencies between the processing of the two block edges 904 and 905.

Moreover, it can clearly be seen here that the amount of sample values used as filter input values and filter output values depends upon the size of the presently processed coding block. For example, the coding block 901 has a coding block size of eight pixels. Therefore, a number 1 of filter input samples is set to four. At the same time, a number M of modified sample values is set to three. I sample values correspond to the pixels $P_{3,x}$, $P_{2,x}$, $P_{1,x}$ and $P_{0,x}$, while M sample values correspond to the pixels $P_{2,x}$, $P_{1,x}$ and $P_{0,x}$.

At the same time, the coding block 902 only has a block size S of four, therefore, the number of input sample values I is set to three, while the number of modified sample values is set to 1.

This means that in case of non-identical block sizes along a block edge to be filtered, an asymmetric filter is used.

Since the block width of block 901 is 8 samples, the filter decision can use the samples $P_{i,j}$ where $i \in [0,1,2,3]$ and $j \in [0,1,2,3,4,5,6,7]$. Since the block width of block Q is 4 samples, the filter decision may only use samples $Q_{i,j}$ where $i \in [3,2,1]$ and $j \in [0,1,2,3,4,5,6,7]$.

For the actual filter operation i.e. the samples which are modified during filter operation, the following applies:

For block 901, since its block width is 8 samples, up to 3 samples can be modified. Therefore the samples $P_{i,j}$ where $i \in [0,1,2]$ and $j \in [0,1,2,3,4,5,6,7]$ can be modified.

For Block 902 since its block width is 4 samples only, up to 1 sample can be modified to ensure there are no filter overlaps. Therefore the samples $Q_{i,j}$ where $i \in [3]$ and $j \in [0,1,2,3,4,5,6,7]$ can be modified.

For Edge 905, the two adjacent blocks, which share the edge, are 902 and 903 with block widths 4 and 4 respectively.

Since the block width of block 902 is 4 samples, the filter decision can use the samples $Q_{i,j}$ where $i \in [0,1,2]$ and $j \in [0,1,2,3,4,5,6,7]$. Since the block width of block 903 is 4 samples, the filter decision may only use samples where $i \in [3,2,1]$ and $j \in [0,1,2,3,4,5,6,7]$.

For the actual filter operation i.e. the samples which are modified during filter operation, the following applies:

For block 902, since its block width is 8 samples, up to 3 samples can be modified. Therefore the samples where $i \in [0,1,2]$ and $j \in [0,1,2,3,4,5,6,7]$ can be modified, in the same way, since block width of Block R is 4 samples only up to 1 sample can be modified to ensure there are no filter overlaps. Therefore the samples where $i \in [3]$ and $j \in [0,1,2,3,4,5,6,7]$ can be modified.

As a result, the asymmetric filter modifies a maximum of 3 samples in block 901, 1 sample in block 902 and 1 sample in block 903.

An actual strong filter operation for blocks whose size is equal to 4 samples is set as follows:

Let us say the blocks adjacent to the block edge are two blocks whose size is equal to 4 samples, then:

The strong filter decision $$|p_{3,i} - P_{0,i}| + |Q_{3,i} - Q_{0,i}| < \frac{\beta}{8}$$

is set to $$|p_{2,i} - p_{0,i}| + |Q_{2,i} - Q_{0,i}| < \frac{\beta}{8}.$$

Both strong and normal filters though only change one pixel, therefore, only when a strong filter is applied then, the one sample in block p is modified as follows:

$$p_0' = (p_2 + 2p_1 + 2p_0 + 2q_0 + q_1 + 4) >> 3.$$

For weak filtering, only a lower number of sample values is used as filter input samples. Especially the following filter equations are used:

$$p_0' = p_0 + \Delta_0,$$

$$q_0' = q_0 - \Delta_0,$$

$$\Delta_0 = \text{Clip3}(-t_C, t_C, \delta),$$

$$\delta = (9 \times (q_0 - p_0) - 3 \times (q_1 - p_1) + 8) >> 4.$$

Figure 10:
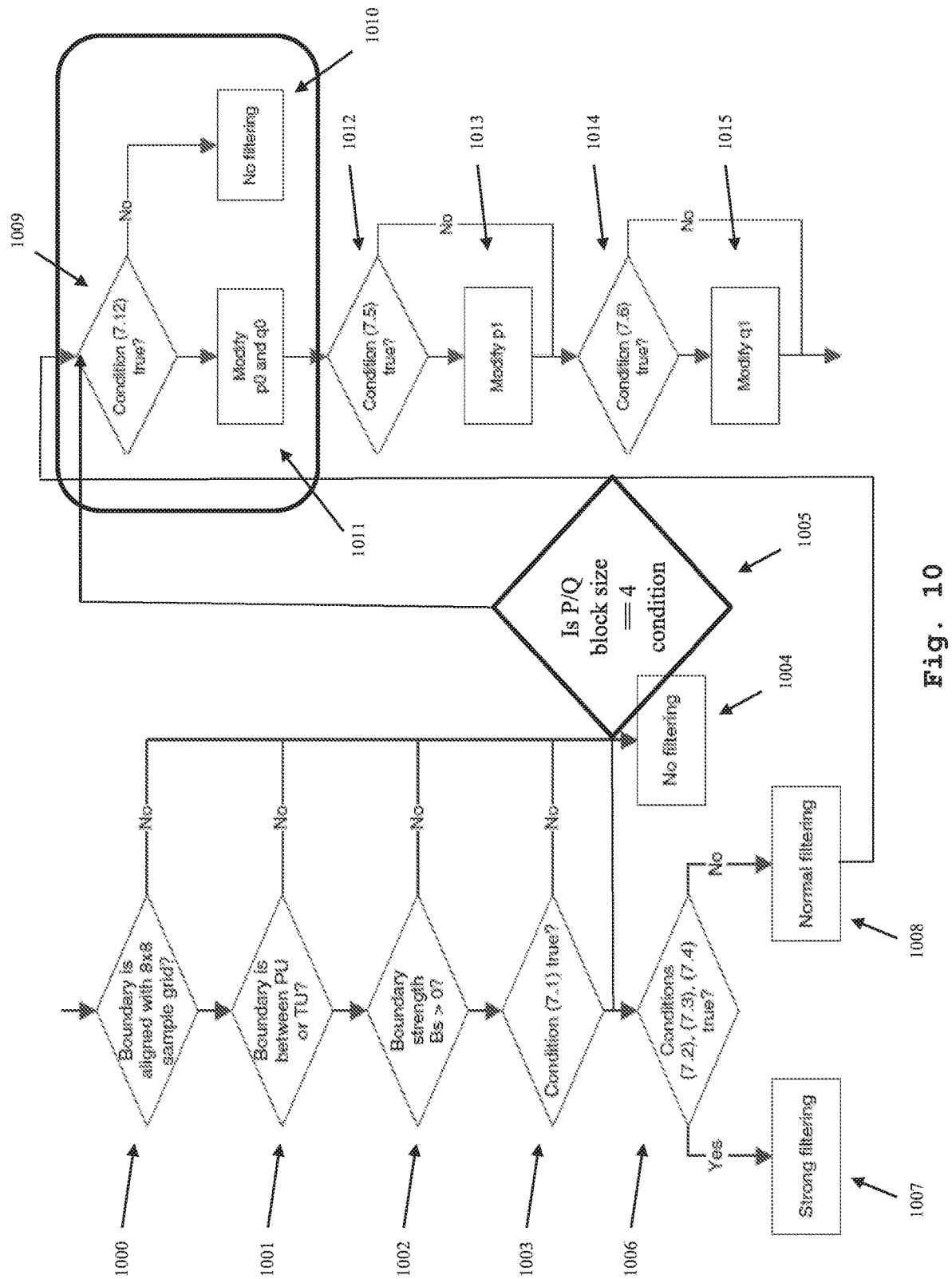
FIG. 10 shows a flow diagram depicting an exemplary process for increasing the efficiency of deblocking filtering.

Instead of using the asymmetric filter as described above, an alternative exemplary solution is presented in FIG. 10. In a first step 1000, it is checked if the currently filtered block edge is aligned with an 8×8 encoding sample grid. If this is the case, in a second step 1001, it is checked if the block edge to be filtered is a boundary between prediction units or transform units. If this is the case, in a third step 1002, it is checked if a boundary strength Bs>0. If also this condition (i.e. a boundary strength Bs>0) is met, in a fourth step 1003 it is checked if a condition 7.1 is true.

Condition 7.1 is used to check if deblocking filtering is applied to a block boundary or not. The condition especially checks how much the signal on each side of the block boundary deviates from a straight line (ramp).

If condition 7.1 is not met, or any of the checks of steps 1000, 1001 and 1002 are not fulfilled, it is decided in a fifth step 1004 that no filtering is performed.

In a sixth step 1005, it is now checked, if the block size of any of the two blocks, surrounding the edge to be filtered, is four. If this is not the case, in a seventh step 1006, it is checked, if further conditions 7.2, 7.3, and 7.4 are met.

Condition 7.2 checks that there are no significant signal variations at the sides of the block boundary. Condition 7.3 verifies that the signal on both sides is flat. Condition 7.4 ensures that the step between the sample values at the sides of the block boundary is small.

If all of these conditions are true, in an eighth step 1007, a strong filtering is performed. If this is not the case, in a ninth step 1008 it is decided that a normal filtering is performed. It is then continued with the normal filtering processing with a tenth step 1009.

In case though the check of the sixth step 1005 resulted in at least one of the blocks having a block size of four, the steps 1006, 1007 and 1008 are not performed, but it is directly continued with step 1009. This solution enforces part of a deblocking flow chart, so that only one sample modification is performed.

In a tenth step 1009, it is checked, if a further condition 7.12 is met. Condition 7.12 evaluates whether the discontinuity at the block boundary is likely to be a natural edge or caused by a block artefact.

If condition 7.12 is not true, in an eleventh step 1010, it is decided that no filtering is performed after all. If this is the case though, in a twelfth step 1011, the pixel values p0 and q0 directly surrounding the edge are modified.

In a further step 1012, it is checked, if a further condition 7.5 is met. Condition 7.5 checks how smooth the signal is on the side of the block boundary (i.e. for block P). The Smoother the signal, the more filtering is applied.

If condition 7.5 is true, a pixel value p1 is modified in a fourteenth step 1013. It is then continued with a fifteenth step 1014. If condition 7.5 is not met, it is directly continued with the fifteenth step 1014, in which a further condition 7.6 is checked.

Condition 7.6 checks how smooth the signal is on the side of the block boundary (i.e. for block Q). The Smoother the signal, the more filtering is applied. If the condition is met, a pixel value q1 is modified in a sixteenth step 1015. If the condition 7.6 is not met, the pixel value q1 is not modified.

This allows for significantly reducing the amount of checks necessary to determine, if a filtering is performed, and which type of filtering is performed, in case of at least one of the block sizes being four.

For details regarding the standard conform conditions mentioned above, it is referred to Vivienne Sze, Mudhukar Budagavi, Gary J. Sullivan, "High Efficiency Video Coding (HEVC), Algorithms and Architectures" (in particular conditions 7.1 to 7.6 and 7.12 correspond to equations 7.1 to 7.6 and 7.12 in Chapter 7).

Figure 11:
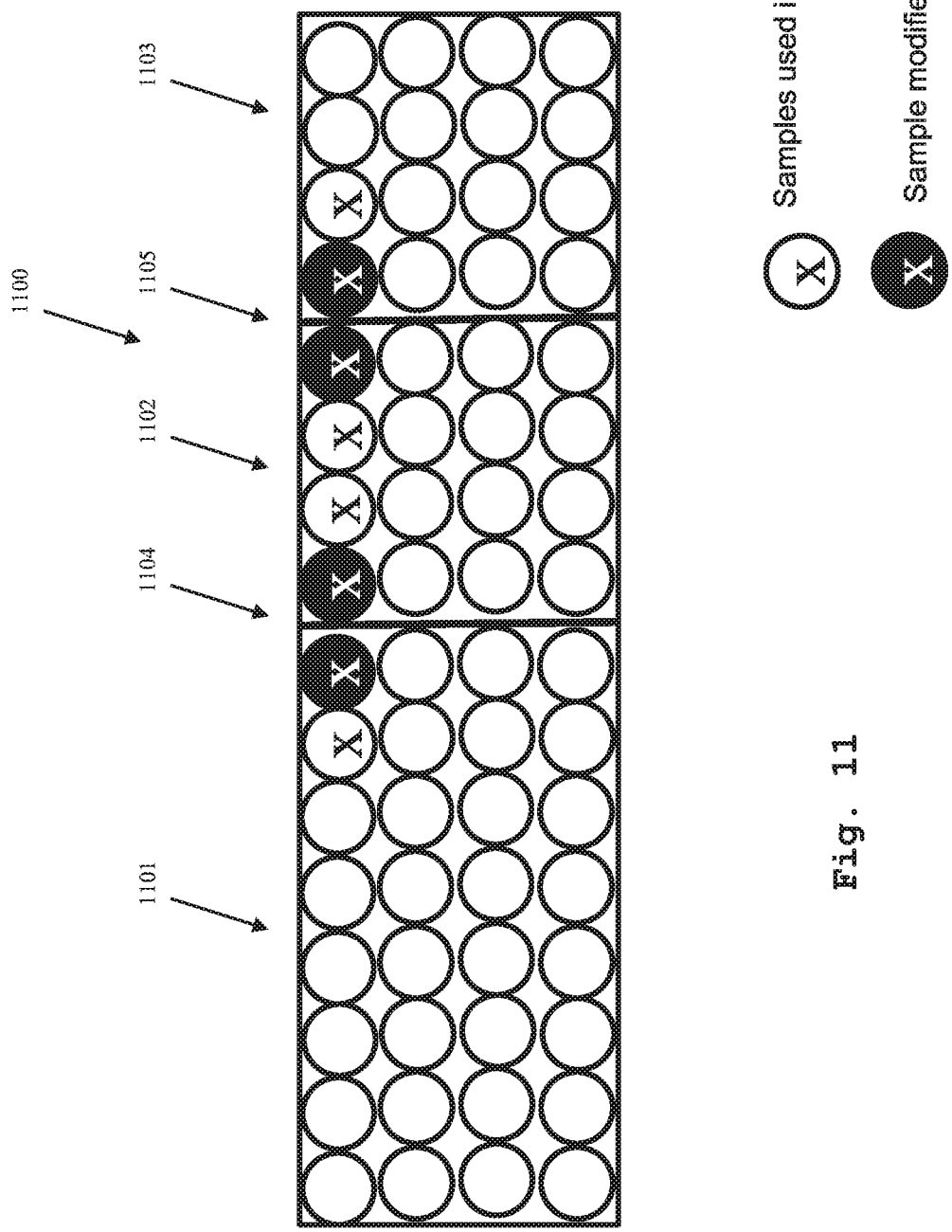
FIG. 11 shows three exemplary coding blocks and respective sample values used and modified during filtering by the exemplary method shown in FIG. 7.

This approach is also shown along FIG. 11. In FIG. 11, an image 1100 including three blocks 1101, 1102 and 1103 is shown. A block edge 1104 divides the blocks 1101 and 1102. A block edge 1105 divides blocks 1102 and 1103. Since block 1102 has a block size of four, when checking for block size during the processing of block edge 1104, it is determined that at least one of the involved blocks 1101, 1102 has a block size of four and the shortcut of step 1005 in filter decision, as shown in FIG. 10 is taken. Therefore, only the sample values directly at the block edge 1104 are modified, while on both sides of the block edge 1104, two consecutive sample values are used as filter input values. The same holds true for the block edge 1105.

Therefore, the option depicted in FIGS. 10 and 11 consists of forcing a weak filtering if a block size of four of at least one of the involved blocks is detected.

Especially, the following equations are used:

$$p_0'=p_0+\Delta_0,$$

$$q_0'=q_0-\Delta_0,$$

$$\Delta_0=\text{Clip3}(-t_C, t_C, \delta),$$

$$\delta=(9\times(q_0-p_0)-3\times(q_1-p_1)+8)>>4.$$

In the future video coding standard, a "long tap" filter which modifies more than 3 samples might be used. In the following, a "long tap" filter which uses 8 samples as filter input values and modifies up to 7 samples may be used whenever the block size is greater than or equal to 16 samples.

To ensure that parallel deblocking is possible in such a scenario, two solutions are proposed:

Solution 1a: Enforce "long tap" filter only when the current blocks size is ≥16 samples and also when the neighboring blocks size is also ≥16 samples.

Solution 2a: Enforce an "Asymmetric filer" as explained earlier.

Therefore the "Asymmetric filter" modifies the samples used as input values and modified values as per the block width.

For example, if block width is 4, then three samples can be used in filter decision and one sample can be modified. If block width is 8, then 4 samples can be used in filter decision and modification. For block width greater than or equal to 16, the long tap filter can be applied as it is.

A further aspect to be taken into account is where the respective block edge lies with regard to the encoded image. Especially, if the presently filtered block edge is aligned with a coding tree unit (CTU) boundary, and is a horizontal block edge, the number of filter input values and filter output values greatly influences the amount of line memory for performing the encoding. This is indicated in FIG. 12.

Figure 12:
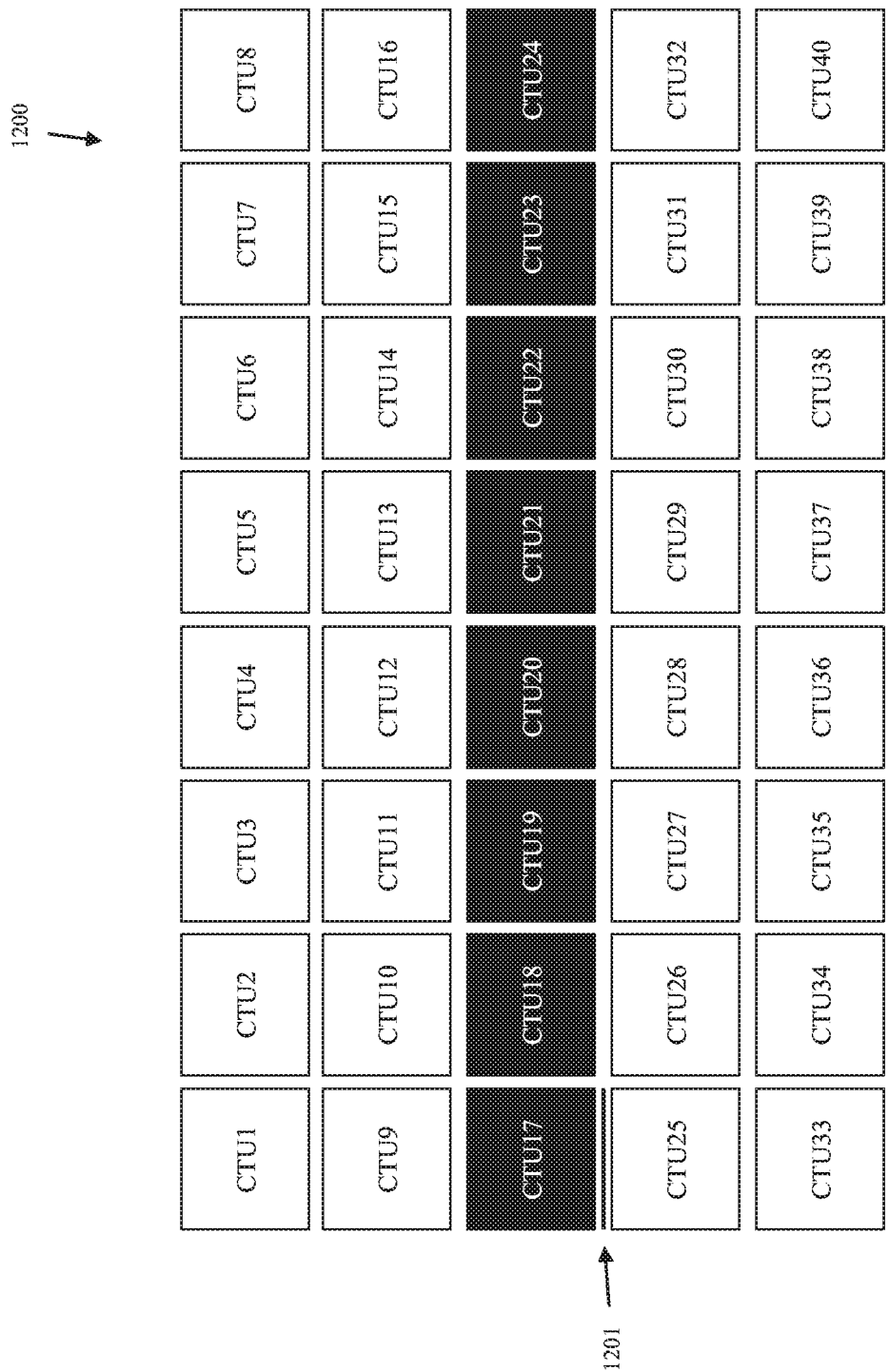
FIG. 12 shows an image including a number of coding units, which is filtered by a fourth embodiment of the first aspect of the application.

FIG. 12 shows an image 1200 including a number of coding tree units CTU1-CTU40. Each coding tree unit has for example 256×256 sample values. If a long-tap filtering is to be performed, as explained above, eight sample values along the encoding block edges are considered for determining the filter output values. Since the coding units CTU1-CTU40 are processed successively, this can lead to an extremely high amount of necessary line memory.

Consider a deblocking filtering of a block edge 1201 indicated in FIG. 12. Here, the block edge 1201 was drawn along the entire width of the coding units CTU17 and CTU25. In practice though, the coding block size will be significantly smaller, since a coding is not performed on the coding tree unit scale.

Since the coding tree units CTU1-CTU40 are processed successively, in order to perform a deblocking of the code block edge 1201, it is necessary to keep the entire lower horizontal border region of the coding tree units CTU17-CTU24 within the line memory. In the example shown here, with eight coding tree units CTU17-CTU24 and a width of 256 samples of each of the coding units, and eight relevant sample values as filter input values, a memory size of 8×256×8=16,384 samples line memory is necessary. For each horizontal coding block edge, this problem arises. It is especially problematic for the coding tree units CTU9, CTU17, CTU25 and CTU33, since in any of these cases, the entire horizontal border region of the previous row of coding tree units needs to be kept in the line memory. This is further depicted in FIG. 13.

Figure 13:
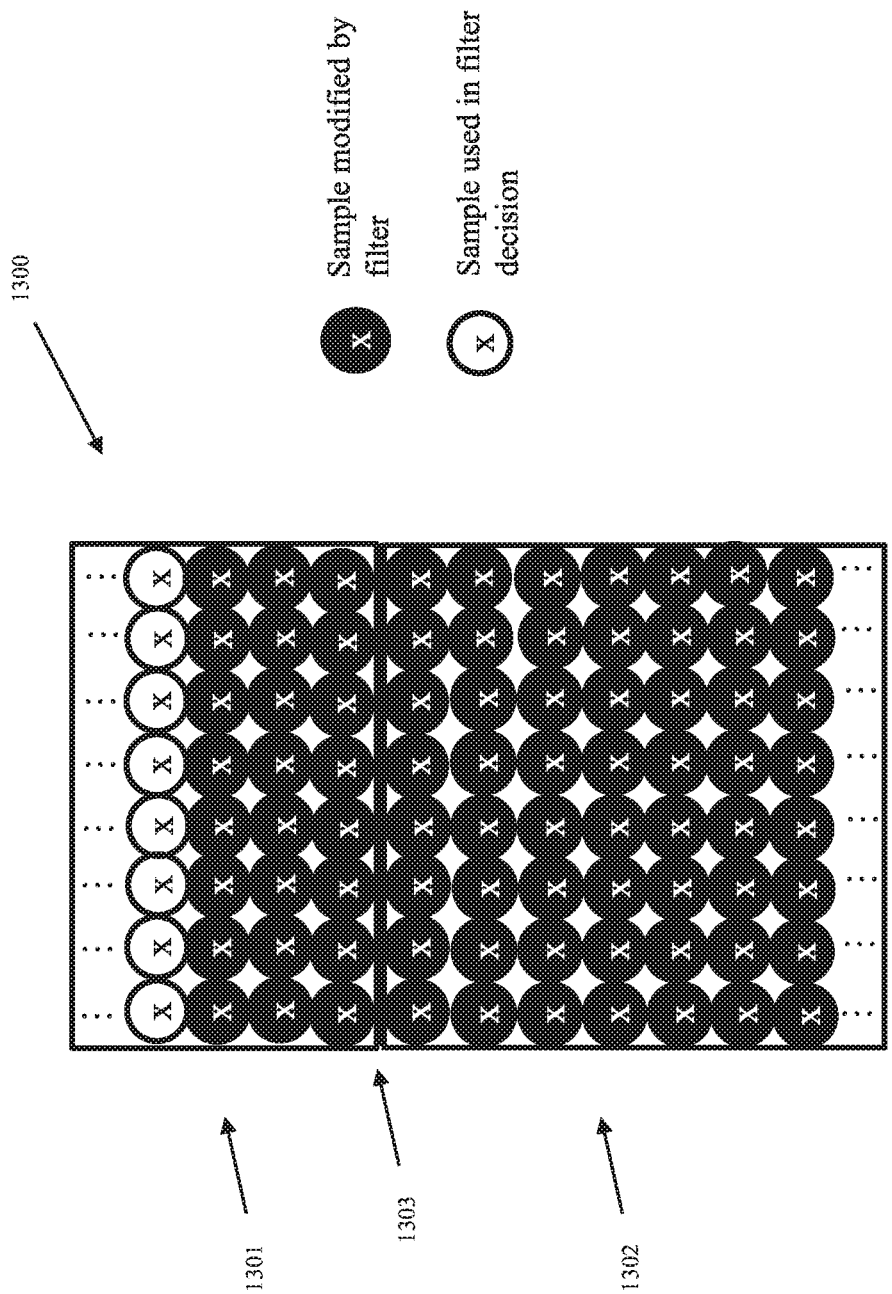
FIG. 13 shows two exemplary coding blocks corresponding to coding blocks of the exemplary image of FIG. 12, and sample values used and modified during filtering by a fifth embodiment of the image processing device according to the first aspect of the application.

In FIG. 13, only the relevant blocks 1301 and 1302 of an image 1300 are depicted. The image 1300 corresponds to the image 1200 of FIG. 12. The block 1301 corresponds to a lowermost coding block of coding unit 17 of FIG. 12, while the block 1302 corresponds to an uppermost coding block of coding unit 25 of FIG. 12. The block edge 1303 corresponds to the block edge 1201 of FIG. 12.

In order to limit the amount of necessary line memory in the above-described case, only a filter input sample value of four of the previous block 1301 is used, while only a filter output sample number of three is modified. This leads to a significant reduction in the amount of necessary line memory, since now only 8×256×4=8,096 samples need to be kept in line memory.

Figure 14:
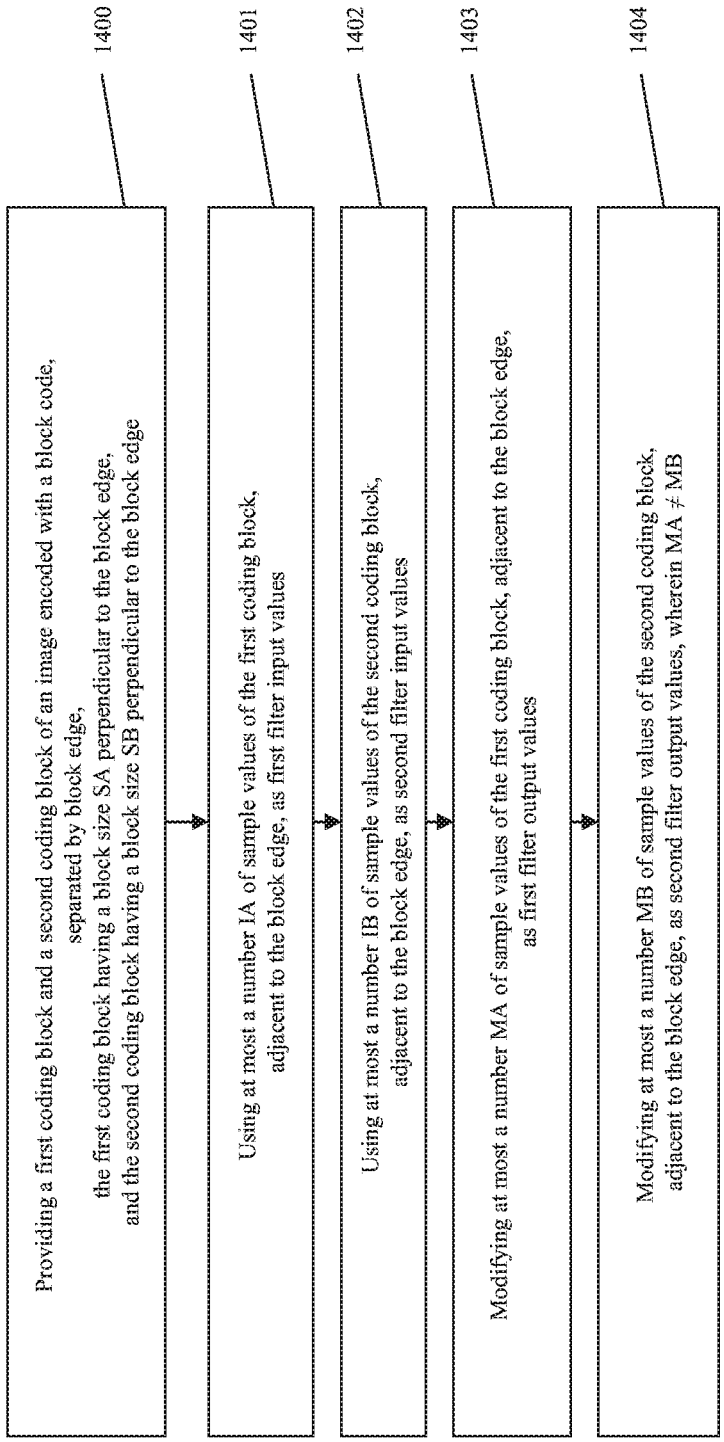
FIG. 14 shows a flow diagram of an embodiment of the image processing method according to the fourth aspect of the application.

Finally, in FIG. 14, an embodiment of the deblocking method of the fourth aspect of the application is shown.

In a first step 1400, a first coding block and a second coding block of an image encoded with a block code, separated by a block edge, are provided.

In a second step 1401 at most a number of $I_A$ of sample values of the first coding block, adjacent to the block edge are used as first filter input values. In a second step 1402, at most a number $I_B$ of sample values of the second coding block, adjacent to the block edge, are used as second filter input values. In a fourth step 1403, at most a number $M_A$ of sample values of the first coding block, adjacent to the block edge, are modified as first filter output values. Finally, in a fifth step 1404, at most a number of $M_B$ of sample values of the second coding block, adjacent to the block edge, are modified as second filter output values. Therein, $M_A$ is not equal to $M_B$.

It should be noted that the filter input values are consecutive values perpendicular to the block edge beginning at the block edge. Also, the filter output values are consecutive values perpendicular to the block edge, beginning at the block edge.

The application has been described in conjunction with various embodiments herein. However, other variations to the disclosed embodiments can be understood and effected in practicing the claimed invention, from a study of the drawings, the disclosure and the appended claims. In the claims, the word "comprising", "including" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

Wherever embodiments and the description refer to the term "memory", the term "memory" shall be understood and/or shall include a magnetic disk, an optical disc, a read-only memory (Read-Only Memory, ROM), or a random access memory (Random Access Memory, RAM), . . . , etc., unless explicitly stated otherwise.

It will be understood that the "blocks" ("units") of the various figures (method and apparatus) represent or describe functionalities of embodiments (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

Embodiments of the application may further include an apparatus, e.g. encoder and/or decoder, which includes a processing circuitry configured to perform any of the methods and/or processes described herein.

Embodiments may be implemented as hardware, firmware, software or any combination thereof. For example, the functionality of the encoder/encoding or decoder/decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu-Ray™ disc, DVD, CD, USB (flash) drive, hard disc, server storage available via a network, etc.

An embodiment of the application includes or is a computer program, and the computer program includes program codes for performing any of the methods described herein, when executed on a computer.

An embodiment of the application includes or is a computer readable medium, and the computer readable medium is configured to store a program code that, when executed by a processor, causes a computer system to perform any of the methods described herein.

What is claimed is:

1. An image processing device for use in an image encoder or an image decoder, for deblocking a block edge between a first coding block and a second coding block of an image, comprising:
   a memory containing instructions; and
   a processor in communication with the memory, upon execution of the instructions, being configured to:
   use values of no more than $I_A$ samples of the first coding block as first filter input values, for calculating first filter output values or second filter output values, wherein the no more than IA samples are in a line perpendicular to and adjacent to the block edge, and $0 \leq I_A \leq S_A$, and wherein the first coding block has a block size of $S_A$ samples perpendicular to the block edge by N samples parallel to the block edge, and the second coding block has a block size of $S_B$ samples perpendicular to the block edge by N samples parallel to the block edge;
   use values of no more than $I_B$ samples of the second coding block as second filter input values, for calculating the first filter output values or the second filter output values, wherein the no more than $I_B$ samples are in a line perpendicular to and adjacent to the block edge, and $0 \leq I_B \leq S_B$;

modify values of no more than $M_A$ samples of the first coding block as the first filter output values, wherein the no more than $M_A$ samples are in a line perpendicular to and adjacent to the block edge, and $0 \leq M_A \leq S_A$; and modify values of no more than $M_B$ samples of the second coding block as the second filter output values, wherein the no more than $M_B$ samples are in a line perpendicular to and adjacent to the block edge, and $0 \leq M_B \leq S_B$, wherein $I_A \neq I_B$ and $M_A \neq M_B$, wherein when $S_A=4$, the processor is further configured to set $I_A$ to 3, and $M_A$ to 1, and wherein when $S_B=8$, the processor is further configured to set $I_B$ to 4, and $M_B$ to 3.

2. The image processing device of claim 1, wherein upon execution of the instructions, the processor is further configured to:

based upon values of no more than $D_A$ samples of the first coding block as first filter decision values, and values of no more than $D_B$ samples of the second coding block as second filter decision values, determine if the block edge is to be filtered or if a strong filtering or a weak filtering is to be performed, wherein the no more than $D_A$ samples are in a line perpendicular to and adjacent to the block edge, $0 \leq D_A \leq S_A$, and the no more than $D_B$ samples are in a line perpendicular to and adjacent to the block edge, $0 \leq D_B \leq S_B$.

3. The image processing device of claim 2, wherein the first filter input values are identical to the first filter decision values, and the second filter input values are identical to the second filter decision values.

4. The image processing device of claim 1, wherein if the block edge is a horizontal block edge, the block edge overlaps with a coding tree unit (CTU) block edge of the image, and the second coding block is a current block and the first coding block is a neighboring block of said current block, the processor is further configured to set $I_A$ to 4, and $M_A$ to 3 or 4.

5. The image processing device of claim 1, wherein upon execution of the instructions, the processor is further configured to determine the value of $I_A$ and $M_A$ based on $S_A$, and values of $I_B$ and $M_B$ based on $S_B$.

6. A method for deblocking a block edge between a first coding block and a second coding block of an image in an image encoding or an image decoding process, and the method comprising:

using values of no more than $I_A$ samples of the first coding block as first filter input values, for calculating first filter output values or second filter output values, wherein the no more than $I_A$ samples are in a line perpendicular to and adjacent to the block edge, and $0 \leq I_A \leq S_A$, and wherein the first coding block has a block size of $S_A$ samples perpendicular to the block edge by N samples parallel to the block edge, and the second coding block has a block size of $S_B$ samples perpendicular to the block edge by N samples parallel to the block edge;

using values of no more than $I_B$ samples of the second coding block as second filter input values, for calculating the first filter output values or the second filter output values, wherein the no more than $I_B$ samples are in a line perpendicular to and adjacent to the block edge, and $0 \leq I_B \leq S_B$;

modifying values of no more than $M_A$ samples of the first coding block as the first filter output values, wherein the no more than $M_A$ samples are in a line perpendicular to and adjacent to the block edge, and $0 \leq M_B < S_A$; and modifying values of no more than $M_B$ samples of the second coding block as the second filter output values, wherein the no more than $M_B$ samples are in a line perpendicular to and adjacent to the block edge, and $0 \leq M_B < S_B$, wherein $I_A \neq I_B$ and $M_A \neq M_B$, wherein when $S_A=4$, the processor is further configured to set $I_A$ to 3, and $M_A$ to 1, and wherein when $S_B=8$, the processor is further configured to set $I_B$ to 4, and $M_B$ to 3.

7. A non-transitory computer-readable medium storing programming codes which, when executed by a computer device, cause the computer device to perform deblocking steps, in an image encoding or an image decoding process, for deblocking a block edge between a first coding block and a second coding block of an image, of:

using values of no more than $I_A$ samples of the first coding block as first filter input values, for calculating first filter output values or second filter output values, wherein the no more than $I_A$ samples are in a line perpendicular to and adjacent to the block edge, and $0 \leq I_A \leq S_A$, and wherein the first coding block has a block size of $S_A$ samples perpendicular to the block edge by N samples parallel to the block edge, and the second coding block has a block size of $S_B$ samples perpendicular to the block edge by N samples parallel to the block edge;

using values of no more than $I_B$ samples of the second coding block as second filter input values, for calculating the first filter output values or the second filter output values, wherein the no more than $I_B$ samples are in a line perpendicular to and adjacent to the block edge, and $0 \leq I_B \leq S_B$;

modifying values of no more than $M_A$ samples of the first coding block as the first filter output values, wherein the no more than $M_A$ samples are in a line perpendicular to and adjacent to the block edge, and $0 \leq M_A < S_A$; and modifying values of no more than $M_B$ samples of the second coding block as the second filter output values, wherein the no more than $M_B$ samples are in a line perpendicular to and adjacent to the block edge, and $0 \leq M_B < S_B$, wherein $I_A \neq I_B$ and $M_A \neq M_B$, wherein when $S_A=4$, the programming codes which, when executed by the computer device, cause the computer device to set $I_A$ to 3, and $M_A$ to 1, and wherein when and $S_B=8$, the programming codes which, when executed by the computer device, cause the computer device to set $I_B$ to 4, and $M_B$ to 3.

* * * * *